United States Patent [19]

Kruka et al.

[11] Patent Number: 4,996,879
[45] Date of Patent: Mar. 5, 1991

[54] SUBSEA PIPELINE LEAK DETECTION

[75] Inventors: Vitold R. Kruka; Robert W. Patterson, both of Houston; Joe H. Haws, Richmond, all of Tex.

[73] Assignee: Shell Oil Company, Houston, Tex.

[21] Appl. No.: 401,274

[22] Filed: Aug. 31, 1989

[51] Int. Cl.$^5$ ............................................. G01M 3/24
[52] U.S. Cl. ...................................... 73/592; 73/40.5 A
[58] Field of Search ............................ 73/592, 40.5 A

[56] References Cited

U.S. PATENT DOCUMENTS

| | | | |
|---|---|---|---|
| 3,055,209 | 9/1962 | Reid et al. | 73/69 |
| 3,162,505 | 12/1964 | Hall | 346/33 |
| 3,744,298 | 7/1973 | Flournoy | 73/40.5 A |
| 3,992,923 | 11/1976 | Roberts | 73/40.5 A |
| 4,020,674 | 5/1977 | Fechter et al. | 73/40.5 R |
| 4,457,163 | 7/1984 | Jackle | 73/40.5 A |
| 4,522,063 | 7/1985 | Ver Nooy | 73/579 |

FOREIGN PATENT DOCUMENTS

| | | | |
|---|---|---|---|
| 2414204 | 10/1975 | Fed. Rep. of Germany . | |
| 2822197 | 11/1979 | Fed. Rep. of Germany | 73/40.5 A |
| 2289838 | 7/1976 | France . | |
| 56-168527 | 12/1981 | Japan . | |
| 238734 | 11/1985 | Japan | 73/592 |
| 297741 | 12/1987 | Japan | 73/592 |
| 214978 | 6/1968 | U.S.S.R. . | |
| 1308850 | 5/1987 | U.S.S.R. | 73/40.5 A |
| 1365719 | 9/1974 | United Kingdom . | |

Primary Examiner—Hezron E. Williams
Assistant Examiner—Joseph W. Roskos

[57] ABSTRACT

A subsea pipeline leak is located by: (1) introducing sonic energy into the line; (2) deploying an array of hydrophones in the vicinity of the line; (3) knowing the orientation of the array; processing the signals from the array so as to identify the location of the sonic anomaly at the pipe rupture created by the sonic energy introduced into the pipe.

6 Claims, 1 Drawing Sheet

SUBSEA PIPELINE LEAK DETECTION

BACKGROUND OF THE INVENTION

This invention relates to a method and apparatus for detecting and locating leaks in submarine pipelines carrying fluids.

Submarine pipelines for the transmission of fluids have been increasingly employed in recent years. Of critical importance is that these pipelines not fail in service since the economic consequences and pollution would be serious.

Methods of leak location in submarine pipelines include dyes, pressure loss calculations, visual sightings of air bubbles, etc. Such methods are sometimes inaccurate and usually difficult to conduct. As a result a time consuming survey of the line may be carried out by divers.

A more promising method of leak location involves the knowledge that liquid emerging from a leak generates noise. However, the noise is present together with background noise. Various attempts which have been made to detect noise due to a leak have involved the use of internal pigs which, unless special precautions are taken, increase background noise. Accordingly, the present invention is directed to overcoming these and other problems experienced by the prior art.

SUMMARY OF THE INVENTION

The present invention provides a method and apparatus for locating leaks in a pipeline by detecting acoustic waves which have been introduced into the pipeline and emitted through a rupture in the pipeline causing the leak.

Thus, according to the present invention, there is provided a method and apparatus for the detection of a leak in a subsea pipeline comprising transmitting acoustic waves into the pipeline and causing said waves to travel through a rupture in said pipeline causing said leak; deploying an array of hydrophones into the vicinity of the pipeline; knowing the location of each of the hydrophones in the array; and correlating the intensity of the acoustic waves received by each hydrophone with the known location of each hydrophone to calculate the location of the leak.

Other purposes, distinction over the art, advantages and features of the invention will be apparent to one skilled in the art upon review of the following.

BRIEF DESCRIPTION OF THE DRAWINGS

The actual construction, operation, and the apparent advantages of the present invention will be better understood by referring to the drawings in which like numerals identify like parts and in which.

DESCRIPTION OF PREFERRED EMBODIMENTS

Figure 1:
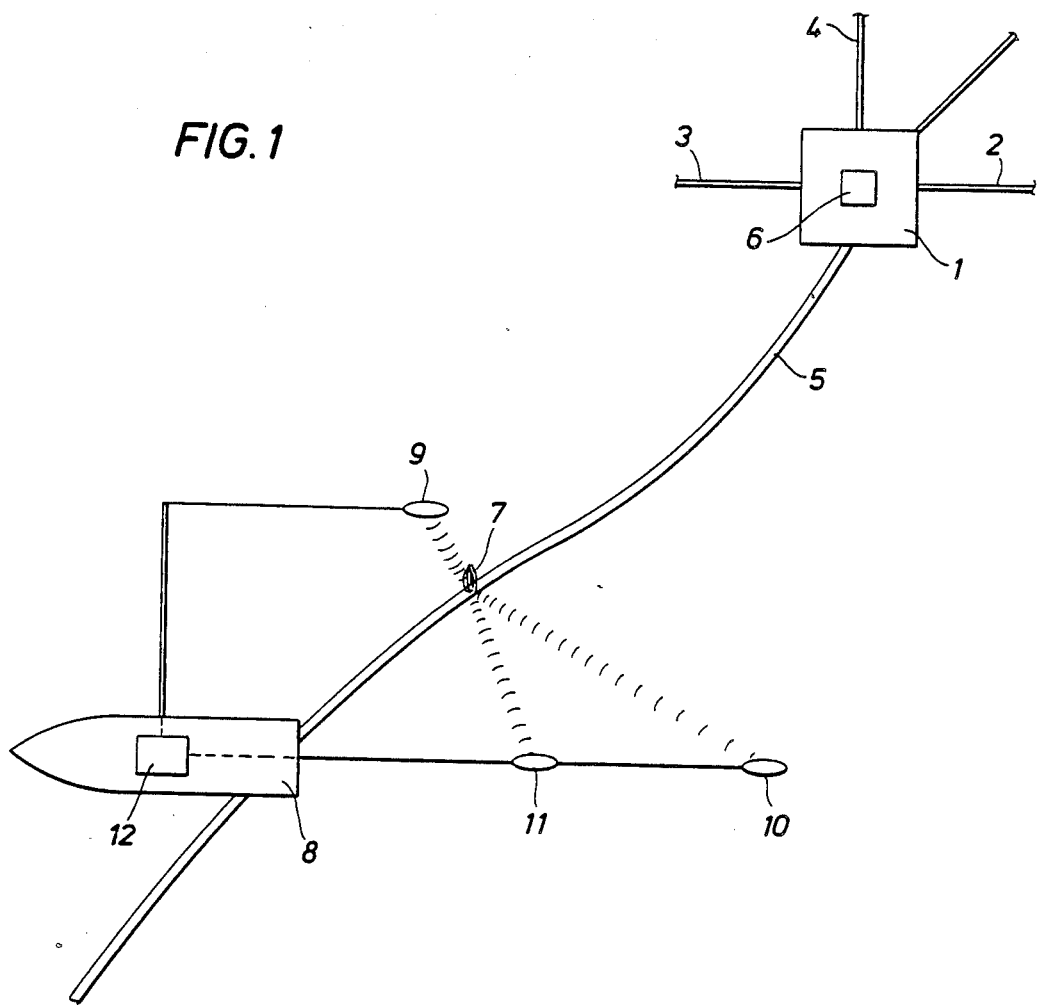
FIG. 1 is a plan view of the leak detection system of the present invention.

Hereinafter the term "acoustic waves" is taken to include both sonic and ultrasonic frequencies. Referring now to the drawings, there is shown in FIG. 1 a gathering means, platform, etc. 1 into which various feed lines 2, 3, and 4 flow and are discharged via a larger trunk line 5. On the platform 1 is located a device 6 for discharging acoustic energy into the pipeline 5. Such generating apparatus is well known in the art and is capable of generating sound waves in any desired range of wave lengths. If desired, a pneumatic sound generator, such as a whistle or siren, can be used. For the particular purpose of the invention it is preferred to use a generating apparatus which emits waves in a sonic range. Ultrasonic frequencies are generally not preferred because they are too rapidly attenuated in the pipe and in the subsea soil, thereby frequently reducing their useful range below normally practical limits.

A leak 7 is shown emerging from a rupture is a pipeline 5. As the ship 8 passes near the leak 7, the acoustic waves generated by the leak are detected by the hydrophones 9, 10 and 11 which are towed in various positions behind the ship. The electrical output from the hydrophones may be amplified by means (not shown) and presented to the operator using well known means is visual or audible form to indicate the presence of the leak. Preferably, the received signal should be recorded on a chart, magnetic tape, or photographic recorder to provide a permanent record for inspection. The hydrophones 9, 11 and 10 are preferably in a triangular position which facilitates finding the location of the leak by correlating the strength of the signal received by each hydrophone with the known positioning of the hydrophones. Box 12 is means for correlating the intensity of the acoustic waves received by each hydrophone with the known location of each hydrophone to calculate the location of the leak. Other distributions of the hydrophones may of course be employed, and it is not necessary that the hydrophone be in a triangular position but could be stretched linearly or in other positions. In addition, the hydrophones may be located in a stationary position around the pipeline or they may be dragged on the seafloor or dragged subsea at a fixed location above the seafloor.

Accordingly, the present invention provides a convenient method of inspecting a submarine pipeline for leaks without taking the pipeline out of use. If the detector is towed along the pipeline as part of a routine inspection procedure, small leaks will be detected and located before they become apparent by other means and before any significant pollution damage has been caused.

The foregoing description of the invention is merely intended to be explanatory thereof, and various changes in the details of the described method and apparatus may be made within the scope of the appended claims without departing from the spirit of the invention.

What is claimed is:

1. A method for the location of a leak in a subsea hydrocarbon pipeline comprising:
    transmitting acoustic waves into the pipeline, said waves traveling through a rupture in said pipeline causing said leak;
    towing an array of hydrophones in the vicinity of the pipeline;
    knowing the relative location of each of the hydrophones in the array; and
    correlating the intensity of the acoustic waves received by each hydrophone will the known location of each hydrophone to calculate the location of the leak.

2. The method of claim 1 wherein the hydrophones are dragged on the seafloor.

3. The method of claim 1 wherein the hydrophones are towed subsea at a fixed height off the seafloor.

4. An apparatus for the location of a leak in a subsea hydrocarbon pipeline comprising:

means for transmitting acoustic waves into the pipeline, said waves traveling through a rupture in said pipeline causing said leak;

means for towing an array of hydrophones in the vicinity of the pipeline;

means for knowing the relative location of each of the hydrophones in the array; and means for correlating the intensity of the acoustic waves received by each hydrophone with the known location of each hydrophone to calculate the location of the leak.

5. The apparatus of claim 4 including means for dragging the hydrophones on the seafloor.

6. The apparatus of claim 4 including means for towing the hydrophone subsea at a fixed height off the seafloor.

* * * * *